Dec. 24, 1957 W. A. BELCHER 2,817,493
LANDING GEAR FOR SEMI-TRAILERS
Filed July 15, 1955 3 Sheets-Sheet 1

INVENTOR.
William A. Belcher,
BY
McMorrow, Berman + Davidson
Attorneys.

United States Patent Office 2,817,493
Patented Dec. 24, 1957

2,817,493

LANDING GEAR FOR SEMI-TRAILERS

William A. Belcher, Norfolk, Va.

Application July 15, 1955, Serial No. 522,303

3 Claims. (Cl. 254—86)

The present invention relates to an electrically operated retractable landing gear for a semi-trailer.

The primary object of the present invention is to provide a retractable landing gear for a semi-trailer which has a self-contained electric motor and one which may be readily attached to the screw jack assembly housing on an existing semi-trailer after removal of the manually operable crank casing.

Another object of the present invention is to provide an electrically operated retractable landing gear for a semi-trailer which may be incorporated in the structure of the screw jack assembly housing provided for existing semi-trailers, and one which is sturdy in construction, economical to manufacture and assemble, and one which is highly effective in action.

These and other objects and advantages of the present invention will be fully apparent from the following description when taken in connection with the annexed drawings, in which:

Figure 4 is a side view of the present invention with the cover removed as seen on line 4—4 of Figure 5; and Figure 5 is a top view of the present invention partially in cross section as seen on line 5—5 of Figure 4.

Figure 3:
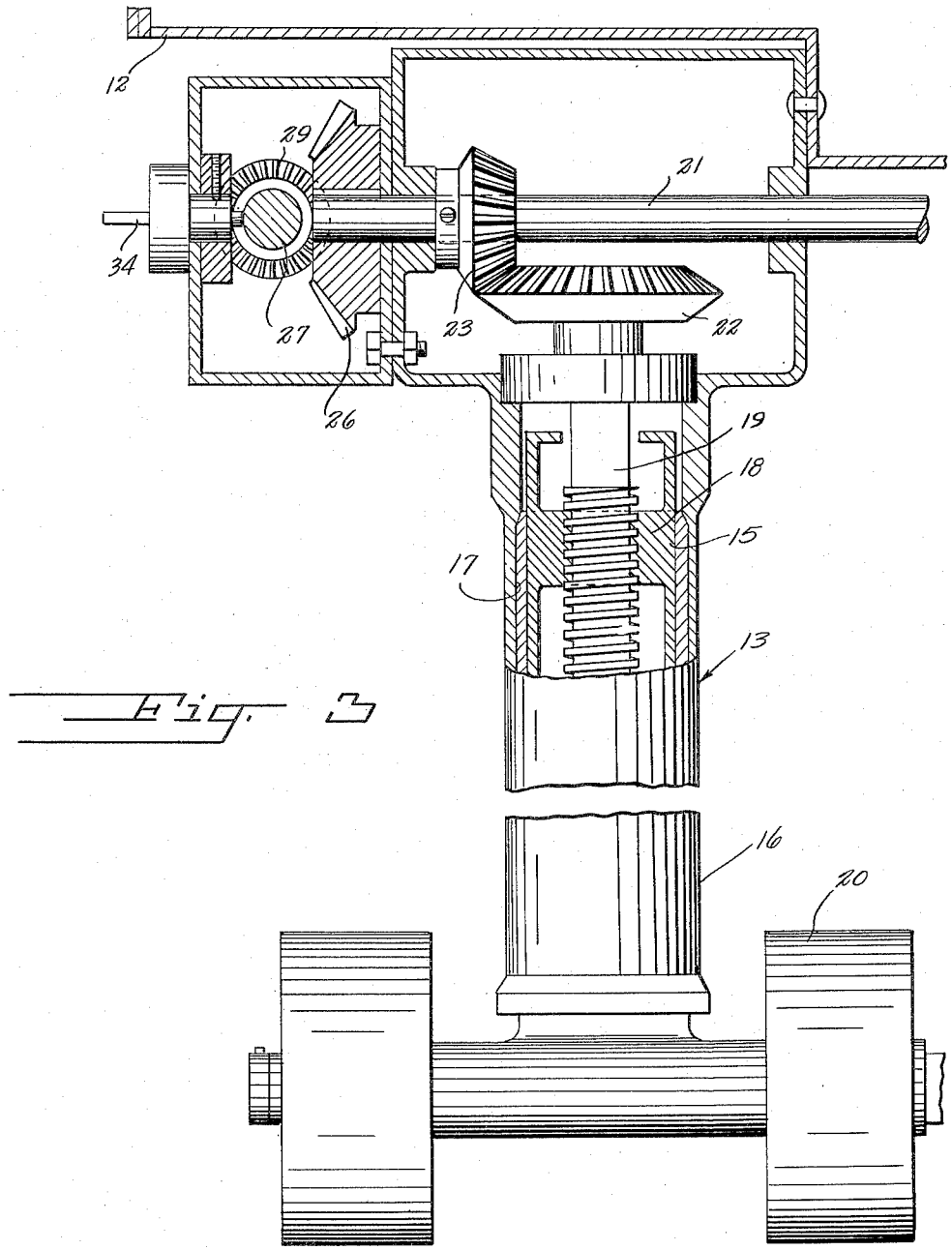
Figure 3 is an end view taken on line 3—3 of Figure 2 and showing the screw jack assembly partially broken away and showing the present invention installed thereon.

Referring in greater detail to the drawing in which like numerals indicate like parts throughout the several views, the present invention consists in a retractable landing gear for a semi-trailer and comprises a pair of housings 10 and 11 arranged in transverse spaced relation beneath the chassis of a semi-trailer 12 adjacent the front end and dependingly secured to the chassis. The housings 10 and 11 each support a screw jack assembly 13 and 14, respectively, each assembly including, as shown in Figure 3, a sleeve 15 mounted for extensile and retractile movement within a cylinder 16, there being coacting guides and slots indicated by the reference numeral 17 to keep the sleeves 15 from turning within their respective cylinders.

A block or nut 18 secured adjacent the upper end of the sleeve 15 has internal threads cooperating with the threads on the screw spindle 19 of the assembly so that upon rotation of the spindle in a clockwise direction the sleeve 15 is raised and upon rotation of the spindle in a counterclockwise direction the sleeve 15 is lowered.

Figure 1:
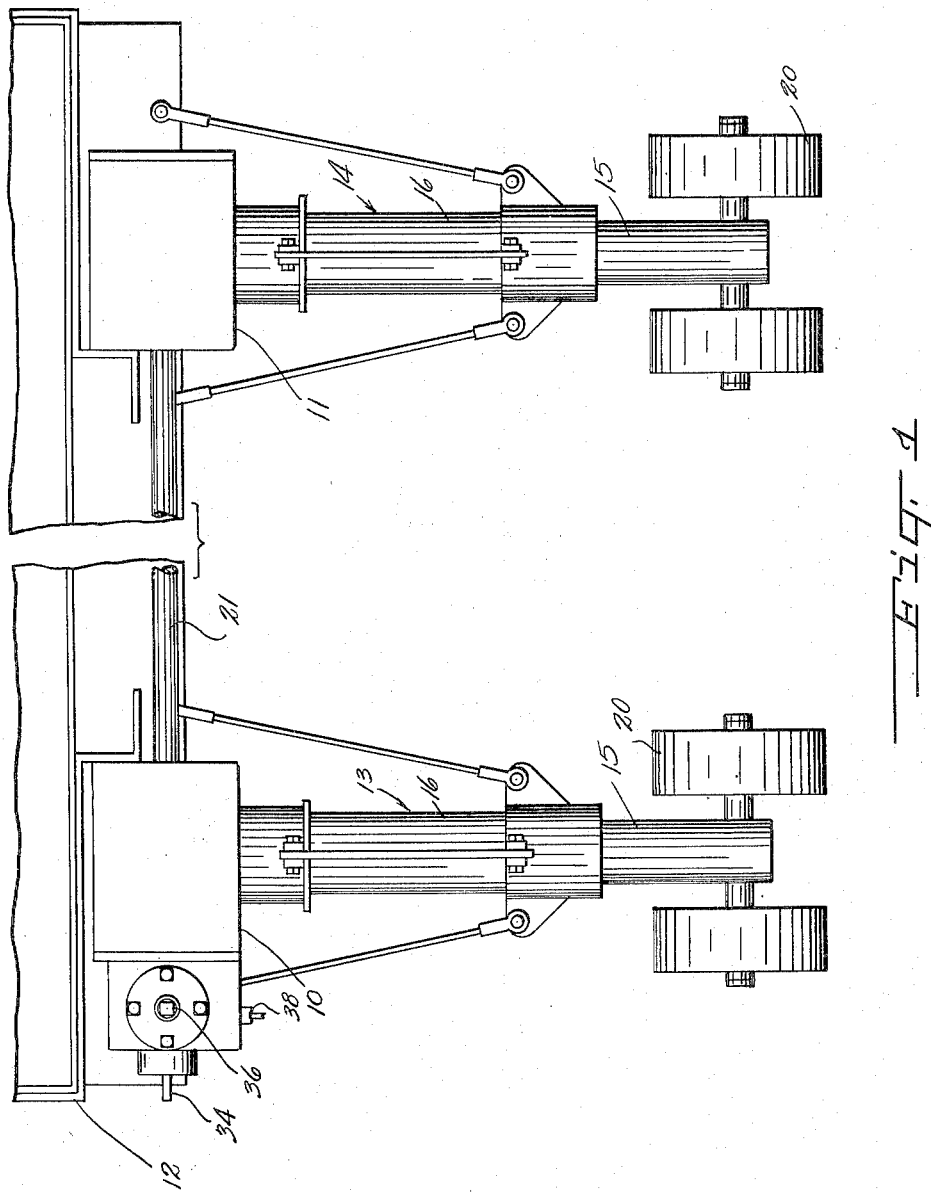
Figure 1 is a front view of the screw jack assembly and double landing gear as attached beneath a semi-trailer.
Figure 2:
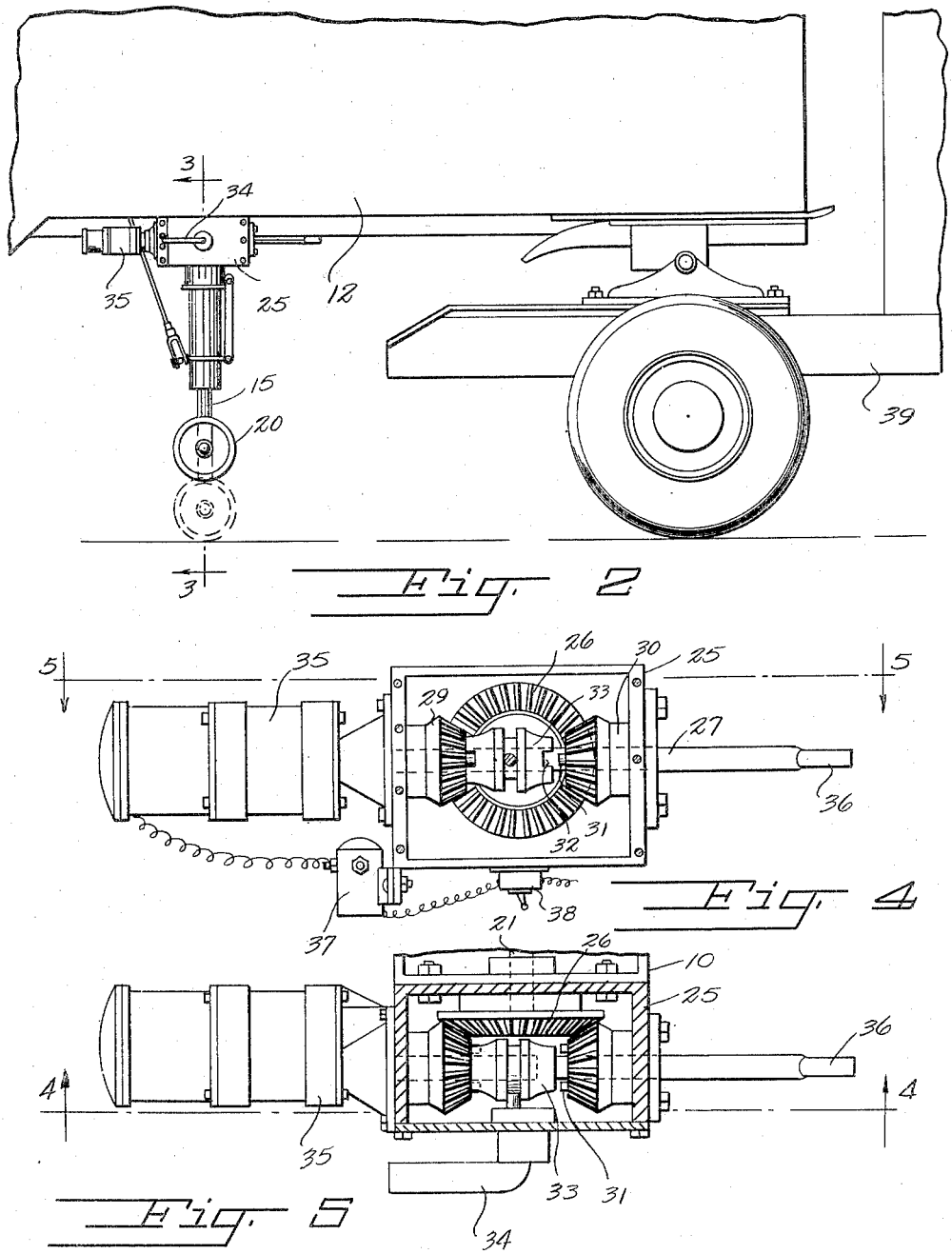
Figure 2 is a side view in elevation showing the present invention installed upon a screw jack assembly of a landing gear as attached beneath a semi-trailer, showing the front end of the trailer supported upon the fifth wheel of a tractor, and showing in dotted lines the extended position of the wheel of the retractable landing gear.

Wheels 20 are carried on the lower ends of each of the sleeves 15 and are moved between the raised position shown in full lines in Figure 2 to the lowered position engaging the ground as shown in dotted lines in that figure.

The upper ends of each of the spindles 19 project into their respective housings 10 or 11 and a drive shaft 21 extends between the projecting ends of the spindles 19, the drive shaft 21 having one end projecting exteriorly of the housing 10.

Within each of the housings 10 and 11 is a means for connecting the drive shaft 21 to the upper end of the screw spindle 19 and consists in a bevel gear 22 mounted on the spindle end and another bevel gear 23 secured to the drive shaft 21, the gears being in mesh with each other.

Another housing 25 is secured in side by side abutting relation to the exterior of the housing 10 and surrounds the projecting end of the drive shaft 21. A ring gear 26 is fixedly secured to the free end of the drive shaft 21 where it projects within the housing 25.

A second shaft 27 extends through the housing 25 transversely of the drive shaft and has its mid-portion adjacent the ring gear 26, the shaft 27 projecting outwardly from each end of the housing 25.

Freely rotatable on the shaft 27 is a pair of opposed pinion gears 29 and 30, each provided with projecting lugs 31 which are selectively receivable in the notches 32 in the clutch coupling 33 so that upon rotation of the shaft 27 and moving the clutch coupling longitudinally on the shaft 27 by means of a handle 34 which is disposed exteriorly on the side wall of the housing 25, the ring gear 26 and drive shaft 21 may be turned in either direction to impart counterclockwise rotational movement or clockwise rotational movement to the spindles 19, effecting the raising or lowering of the wheels 20.

An electric motor 35 is secured to the rear end of the housing 25 and has its shaft connected to the adjacent one end of the shaft 27, the other end of the shaft 27 being squared as indicated by the reference numeral 36 and adapted to receive thereon a crank for manual operation of the screw jack assembly upon failure of the motor 35 or in places where electric power is not available.

A relay 37 and 38 on the underside of the housing 25 provides means by which the motor 35 may be energized, the motor being chosen from those which will be operated by the current available in truck terminals or available to the tractor, the latter being indicated in Figure 2 by reference numeral 39.

What is claimed is:

1. A landing gear for a semi-trailer comprising a pair of housings arranged in transverse spaced relation adapted to be positioned underneath a semi-trailer adjacent the front end thereof and fixedly secured thereto, an upstanding wheel-supported screw jack assembly positioned below each of said housings and having the upper end of its screw spindle projecting into said housing, a drive shaft extending between the projecting ends of the screw spindles of said screw jack assemblies and having one end exteriorly of one of said housings, gear means within each of said housings drivingly connecting said drive shaft to each of said screw spindle upper ends for rotary movement in clockwise and counterclockwise directions, another housing arranged in side by side abutting relation with respect to said one housing surrounding said drive shaft end and fixedly secured to said housing, a ring gear fixedly secured to said drive shaft end, a rotatable second shaft extending through said last named housing transversely of said drive shaft and having each end portion projecting from the adjacent end of said last named housing, a pair of pinion gears supported on the portion of said second shaft within said last named housing for rotation about said shaft as an axis and each in mesh with said ring gear, clutch means interposed between said pinion gears and movable on said said second shaft to selectively engage said pinion gears to rotate said ring gear in a direction to effect rotation of said screw spindles in clockwise and counterclockwise directions, each of said end portions of said second shaft being adapted to be connected to a source of rotative power.

2. A landing gear for a semi-trailer comprising a pair of housings arranged in transverse spaced relation adapted to be positioned underneath a semi-trailer adjacent the front end thereof and fixedly secured thereto, an upstanding wheel-supported screw jack assembly positioned below each of said housings and having the upper end of its screw spindle projecting into said housing, a drive shaft extending between the projecting ends of the screw spindles of said screw jack assemblies and having one end exteriorly of one of said housings, gear means within each of said housings drivingly connecting said drive shaft to each of said screw spindle upper ends for rotary movement in clockwise and counterclockwise directions, another housing arranged in side by side abutting relation with respect to said one housing surrounding said drive shaft end and fixedly secured to said housing, a ring gear fixedly secured to said drive shaft end, a rotatable second shaft extending through said last named housing transversely of said drive shaft and having one end portion projecting from one end of said last named housing, a pair of pinion gears supported on the portion of said second shaft within said last named housing for rotation about said shaft as an axis and each in mesh with said ring gear, clutch means interposed between said pinions and movable on said second shaft to selectively engage said pinion gears to rotate said ring gear in a direction to effect rotation of said screw spindles in clockwise and counterclockwise directions, and motor means exteriorly of said second named housing operatively connected to said end portion of said second shaft for effecting the rotation of the latter.

3. A landing gear for a semi-trailer comprising a pair of housings arranged in transverse spaced relation adapted to be positioned underneath a semi-trailer adjacent the front end thereof and fixedly secured thereto, an upstanding wheel-supported screw jack assembly positioned below each of said housings and having the upper end of its screw spindle projecting into said housing, a drive shaft extending between the projecting ends of the screw spindles of said screw jack assemblies and having one end exteriorly of one of said housings, gear means within each of said housings drivingly connecting said drive shaft to each of said screw spindle upper ends for rotary movement in clockwise and counterclockwise directions, another housing arranged in side by side abutting relation with respect to said one housing surrounding said drive shaft end and fixedly secured to said housing, a ring gear fixedly secured to said drive shaft end, a rotatable second shaft extending through said last named housing transversely of said drive shaft and having each end portion projecting from the adjacent end of said last named housing, a pair of pinion gears supported on the portion of said second shaft within said last named housing for rotation about said shaft as an axis and each in mesh with said ring gear, clutch means interposed between said pinion gears and movable on said second shaft to selectively engage said pinion gears to rotate said ring gear in a direction to effect rotation of said screw spindles in clockwise and counterclockwise directions, and motor means exteriorly of and secured to said second named housing operatively connected to one end portion of said second shaft for effecting the rotation of the latter, the other end portion of said second shaft being adapted to be connected to a hand crank for manual rotation of said second shaft.

References Cited in the file of this patent
UNITED STATES PATENTS

| | | |
|---|---|---|
| 2,001,411 | Davis | May 14, 1935 |
| 2,347,921 | Miller | May 2, 1944 |
| 2,464,890 | Premo | Mar. 22, 1949 |
| 2,523,152 | Seyferth | Sept. 19, 1950 |
| 2,674,438 | Dalton | Apr. 6, 1954 |